(12) United States Patent
Antony

(10) Patent No.: US 9,183,093 B2
(45) Date of Patent: Nov. 10, 2015

(54) VIRTUAL MACHINE CRASH MANAGEMENT

(71) Applicant: VMWARE, INC., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 107 days.

(21) Appl. No.: 14/156,461

(22) Filed: Jan. 16, 2014

(65) Prior Publication Data

US 2015/0161008 A1 Jun. 11, 2015

(30) Foreign Application Priority Data

Dec. 5, 2013 (IN) .......................... 5612/CHE/2013

(51) Int. Cl.
*G06F 11/00* (2006.01)
*G06F 11/14* (2006.01)
*G06F 9/455* (2006.01)
*G06F 17/30* (2006.01)

(52) U.S. Cl.
CPC ........ *G06F 11/1448* (2013.01); *G06F 9/45545* (2013.01); *G06F 11/1402* (2013.01); *G06F 11/1412* (2013.01); *G06F 17/3007* (2013.01)

(58) Field of Classification Search
CPC ............ G06F 11/1448; G06F 11/1412; G06F 9/45545; G06F 17/3007; G06F 11/1402
USPC .......................................................... 714/38.1
See application file for complete search history.

(56) References Cited

U.S. PATENT DOCUMENTS 8,621,461 B1 * 12/2013 Chandrachari ..... G06F 9/45545
718/1
2011/0246986 A1 * 10/2011 Nicholas et al. .................. 718/1

* cited by examiner

*Primary Examiner* — Yair Leibovich

(57) ABSTRACT

Systems and techniques are described for managing virtual machines crashes. A described technique includes determining that a virtual machine is unresponsive, in response to determining that the virtual machine is unresponsive, identifying one or more files in which a guest operating system (OS) of the virtual machine writes data when the guest OS abnormally terminates, the one or more files being stored in virtual storage, determining, based on contents of the one or more files, whether the guest OS has abnormally terminated, in response to determining that the guest OS has abnormally terminated, monitoring requests initiated by the virtual machine to determine whether the guest OS has finished writing to the one or more files, and in response to determining that the guest OS has finished writing to the one or more files, copying the one or more files to a location in hardware storage, and restarting the virtual machine.

20 Claims, 4 Drawing Sheets

VIRTUAL MACHINE CRASH MANAGEMENT

RELATED APPLICATIONS

Benefit is claimed under 35 U.S.C. 119(a)-(d) to Foreign application Serial No. 5612/CHE/2013 filed in India entitled "VIRTUAL MACHINE CRASH MANAGEMENT", filed on Dec. 5, 2013, by VMware, Inc., which is herein incorporated in its entirety by reference for all purposes.

BACKGROUND

This document relates to identifying a guest operating system (OS) that has crashed and collecting data related to the crash.

A virtual machine (VM) is a software-based abstraction of a physical computer system. A VM is executed on a physical computer through the use of virtualization software typically referred to as a "hypervisor." A physical computer system, referred to herein as a host machine, can execute one or more VMs. The hypervisor is software that is logically interposed between and interfaces with a VM and a physical computer system. In general, each VM is configured to execute an operating system, referred to herein as a guest OS, and applications.

SUMMARY

In general, one aspect of the subject matter described in this document can be embodied in a technique that includes determining that a virtual machine is unresponsive; in response to determining that the virtual machine is unresponsive: identifying one or more files in which a guest operating system (OS) of the virtual machine writes data when the guest OS abnormally terminates, the one or more files being stored in virtual storage; determining, based on contents of the one or more files, whether the guest OS has abnormally terminated; and in response to determining that the guest OS has abnormally terminated, monitoring requests initiated by the virtual machine to determine whether the guest OS has finished writing to the one or more files; and in response to determining that the guest OS has finished writing to the one or more files: copying the one or more files to a location in hardware storage; and restarting the virtual machine.

These and other aspects can optionally include one or more of the following features. The virtual machine may be a member of a high availability cluster. Copying the one or more files to hardware memory can include copying the one or more files to a shared storage for the high availability cluster. Monitoring requests initiated by the virtual machine can include monitoring input and output requests directed to the one or more files.

Aspects can include capturing display data output by the virtual machine in response to determining that the virtual machine has abnormally terminated, and comparing the display data output by the virtual machine to one or more screenshots to determine a cause for the abnormal termination of the virtual machine. Each of the one or more screenshots can be associated with a respective cause.

Aspects can include suspending the virtual machine in response to determining that the guest OS has finished writing to the one or more files, and copying content of memory used by the virtual machine to a location in hardware storage that is not written to by the virtual machine prior to restarting the virtual machine.

In some implementations, the virtual machine is a member of a high availability cluster. Aspects can include initiating monitoring of the one or more files to determine whether the guest OS has abnormally terminated in response to determining that a particular crash monitoring setting is active for the VM, and initiating monitoring of a second VM based on a status indicator in response to determining that the particular crash monitoring setting is inactive for the second VM.

Aspects can include accessing a log file for the virtual machine that is stored in virtual storage to identify a memory location for a core file of the virtual machine. Determining whether the virtual machine has abnormally terminated can include evaluating the core file to determine whether the virtual machine has crashed.

Particular embodiments of the subject matter described in this document can be implemented so as to realize one or more of the following advantages. A hypervisor can better determine whether a virtual machine's guest OS has abnormally terminated ("crashed") by evaluating one or more log files or core files generated by the guest OS. The hypervisor can also determine the cause of the crash by capturing a screenshot of the virtual machine and comparing the screenshot to screenshots for particular types of guest OS crashes. Data related to crashed VMs that are members of high availability clusters, can be protected from being overwritten by more accurately determining when the VMs have crashed and copying the data to a data storage location, such as a shared storage location, for analysis. VMs of a high availability cluster that have crashed can be restarted automatically after collecting the appropriate data, thereby reducing downtime of the VM.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like Reference Numbers and Designations in the Various Drawings Indicate Like Elements.

DETAILED DESCRIPTION

This document generally describes techniques for determining whether a virtual machine (VM) and/or its guest OS has crashed (e.g., terminated abnormally) and collecting data related to the guest OS and/or the VM in response to a crash. A crash agent executing in a hypervisor is configured to manage execution of the VM and can identify a location of a core file or log file for the VM, for example, in response to determining that the VM (or its guest OS) has become unresponsive. The crash agent can also evaluate the file(s) to determine whether the guest OS has crashed. By evaluating the file(s), the crash agent can more accurately determine whether the guest OS has crashed or whether the VM is temporarily unresponsive. In response to determining that the guest OS has crashed, the crash agent can collect core files, log files, memory files, memory checkpoint files, and/or data used to create a screenshot of the VM. This data can be used to determine the cause of the crash and/or to restart the VM.

Figure 1:
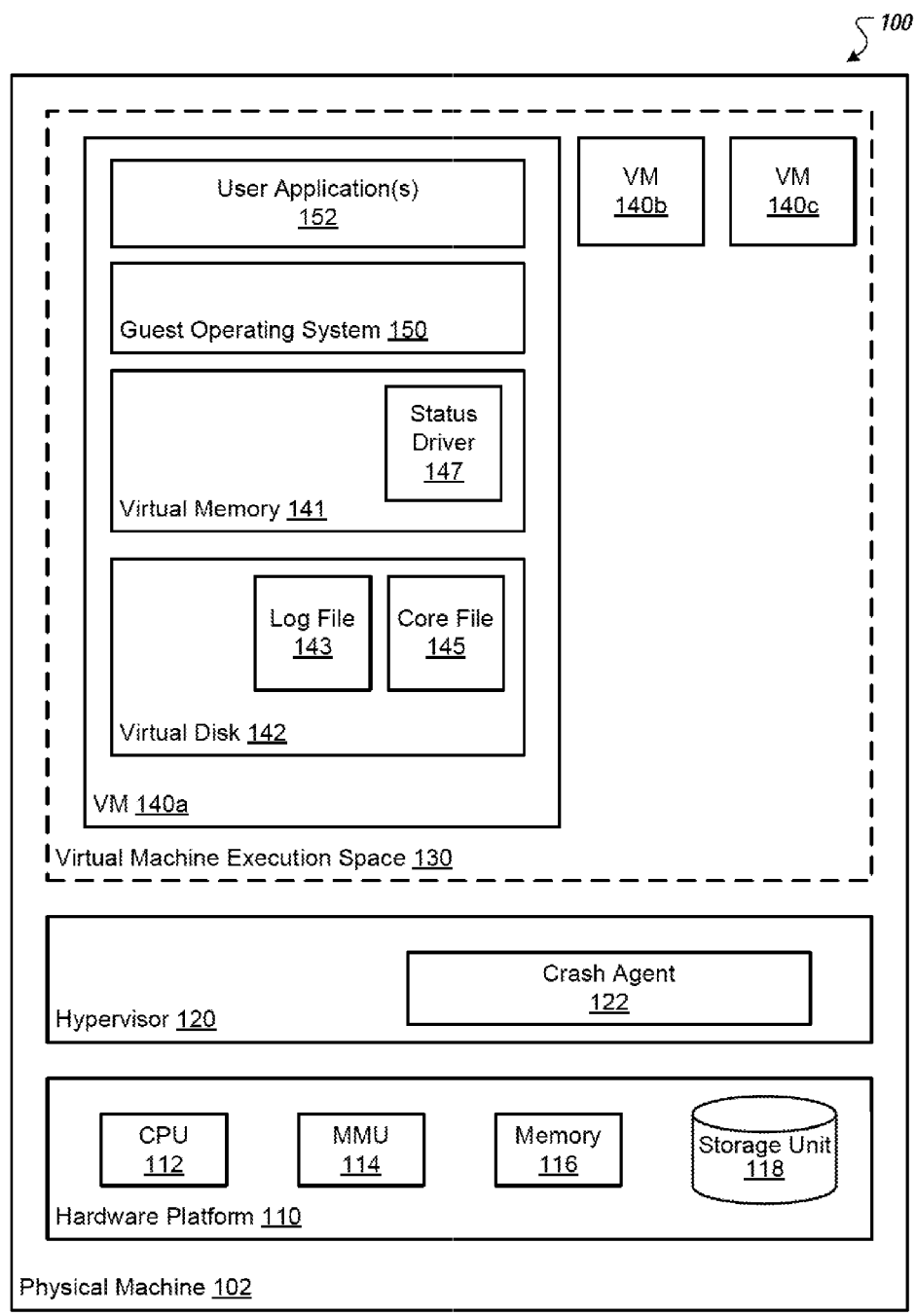
FIG. 1 shows an architecture for an example system that is configured to manage virtual machine crashes.

FIG. 1 shows an architecture for an example system 100 that is configured to manage VM crashes. In the system 100, a physical machine 102 is configured to execute VMs 140a-140c using a hypervisor 120. The physical machine 102 is one or more data processing apparatus that each includes a hardware platform 110. The hardware platform 110 may include, for example, a processor (CPU) 112, a memory management unit (MMU) 114, memory 116 (e.g., Random Access Memory (RAM)), a local storage unit 118 (e.g., hard disk or flash memory), a network adapter, and so on.

The hypervisor 120 is a virtualization software layer that executes on the hardware platform 110. The hypervisor 120 manages a virtual machine execution space 130 within which one or more VMS 140a-140c may be concurrently instantiated and executed. Although three VMs 140a-140c are illustrated in FIG. 1, the hypervisor 120 can manage other numbers of VMs. For each VM 140a-140c, the hypervisor 120 manages a corresponding virtual hardware platform. Each virtual hardware platform includes emulated hardware, e.g., a virtual storage device, a virtual network adapter/interface, virtual memory, a virtual processor, and so on.

Each VM 140a-140c managed by the hypervisor 120 executes a guest operating system, e.g., guest OS150, that executes user applications, e.g., user applications 152. The hypervisor 120 transforms input/output (I/O) requests from the guest OS 150 to the corresponding virtual hardware platform into corresponding requests to the hardware platform 110. The hypervisor 120 can be configured to manage VMs having different types of operating systems. For example, the hypervisor 120 may be configured to concurrently manage VMs executing a Windows OS and VMs executing a Linux OS.

Each VM also includes virtual storage for storing data related to the VM. The virtual storage can include virtual memory 141 and a virtual disk 142. The guest OS 150 and/or the user applications 152 can store and access data of the virtual memory 141 and the virtual disk 142. The hypervisor 120 can map the VM's virtual storage to hardware storage (e.g., hardware memory 116 and local storage unit 118). For example, when the guest OS 150 writes data to virtual memory 141, the hypervisor 120 can store the data in a corresponding location in hardware memory 116 based on the mapping. Similarly, when the guest OS 150 requests data from virtual memory 141, the hypervisor 120 can obtain the data from hardware memory 116 and provide the data to the guest OS 150. Similar mapping can be used to map the virtual disk 142 to the local storage unit 118.

The virtual disk 142 includes a log file 143 and a core file 145. Of course, the virtual disk 142 can include other data files, such as those created by the guest OS 150 or the user applications 152. The log file 143 and/or the core file 145 can also be stored in virtual memory 141, or another storage location.

The guest OS 150 can store data related to its operations in the log file 143. For example, the guest OS 150 may store data in the log file 143 that indicates a memory location in which the guest OS 150 stored particular data. The guest OS 150 may also store data regarding I/O requests initiated by the guest OS 150 in the log file 143.

The guest OS 150 can create a core file 145 and store the core file 145 in the virtual disk 143, for example, in response to the guest OS 150 (or virtual machine 140a) crashing. In the core file 145, the guest OS 150 can store data related to the state of the guest OS 150 and/or the virtual machine 140a at the time of the crash and/or prior to the crash. For example, the core file 145 may store the contents of memory files used by the guest OS 150. The guest OS 150 may also store the content of processor registers (e.g., for the virtual processor of its hardware platform), data regarding any warnings or flags issued by the guest OS 150 or another application, the status of pointers or memory management modules, and/or other data that can be used to determine the cause of the crash and restart the virtual machine in its previous state.

The virtual memory 141 includes a status driver 147 that can provide data indicating the status of the virtual machine 140a and/or the status of the guest OS 150 ("status indicator") to a crash agent 122 of the hypervisor 120. For example, the status driver 147 may provide a heartbeat status indicator to the crash agent 122 periodically while the virtual machine 140a is functioning properly. If the virtual machine 140a, the guest OS 150, and/or the status driver 147 become unresponsive, for example by failing and/or while attempting to complete a process, the status driver 147 may not be able to provide the status indicator to the crash agent 122. Although the status driver 147 is illustrated as being stored in the virtual memory 141, the status driver 147 may be an application or driver that is executing at another location in the virtual machine 140a.

The crash agent 122 is a module (e.g., software and/or hardware) that determines whether a VM's guest OS has crashed and stores data related to the VM in response to the VM crashing. The crash agent 122 can monitor a status indicator for each VM that the hypervisor 120 is managing. If the status driver 147 of a VM fails to provide a status indicator within a threshold amount of time from the time that a previous status indicator was received, the crash agent 122 may determine that the VM is unresponsive. In response, the crash agent 122 may evaluate other information to determine whether the unresponsive VM has crashed rather than being temporarily unresponsive.

As described above, a guest OS 150 of a VM creates and stores data in a core file 145 when the guest OS crashes. In some implementations, the crash agent 122 can also enable a core dump by the guest OS by issuing OS specific commands to the guest OS with the help of one or more tools or modules installed in the guest OS (or elsewhere in the VM). When a VM becomes unresponsive, the crash agent 122 can identify the virtual storage location for a core file 145 for the unresponsive VM. In some implementations, the crash agent 122 may store data identifying the virtual storage location of the core file 145 for each VM. If the crash agent 122 does not have data identifying the location of the core file 145 (e.g., the core file is created in response to the crash), the crash agent 122 may identify the location of the core file 145 in virtual storage using a log file 143 for the VM and/or I/O requests initiated by the guest OS 150 of the unresponsive VM. For example, the log file 143 may include a log of data requests made to the core file 145. This log of data can also include the virtual storage location for the data requests, including the virtual storage location of the core file 145. To identify the location of the core file 145 in virtual storage using I/O requests, the crash agent 122 can identify I/O requests for storing data in the core file 145.

The crash agent 122 can evaluate the contents of the core file 145 and/or the log file 143 for an unresponsive VM to determine whether the guest OS of the unresponsive VM has crashed. For example, if the unresponsive VM's guest OS has crashed, the core file 145 will likely include data related to the crash. This data may also have a timestamp for the data. The crash agent 122 can access the core file 145 to determine whether the core file 145 has data indicating that the VM has crashed. Similarly, the log file 143 may include data regarding data that was been written to the core file 145 or other logged data that indicates that the VM has crashed. The crash agent 122 can evaluate the contents of one or both files to determine whether the guest OS of the VM has crashed.

If the crash agent 122 determines that the VM's guest OS has crashed, the crash agent 122 can collect data related to the VM and store the data in hardware memory 116, the local disk 118, and/or another memory location (e.g., that is communicably coupled to the physical machine 102 by way of a network). This data can include the VM's core file 145, log file 143, memory files, memory checkpoint files, a screenshot of the VM, and/or other data related to the VM. The crash agent 122 can store the data in a location such that the data cannot be overwritten by the VM or another application. For example, the data may be stored in the local storage unit 118 and/or in a remote storage location that is not written to by the VM. In some implementations, the data may be stored in a data storage location (e.g., within the local storage unit 118 and/or the remote storage location) that is not written to during normal operation of the VM or that is inaccessible by the VM.

The data can then be used to determine what caused the VM to crash and/or to restart the VM. After copying the data related to the VM, the hypervisor 120 can restart the VM. Memory checkpoint files, the contents of processor registers, and/or other data that can be used to return the VM to its previous state before crashing can be written to the VM upon restarting the VM.

The crash agent 122 can also take a screenshot of the VM. For example, the crash agent 122 may capture data from I/O requests sent by the virtual machine to a virtual display. This screenshot and its data can be compared to standard screenshots for certain types of crashes to determine what caused the VM's guest OS to crash, as described below.

The crash agent 122 can also monitor I/O requests initiated by the guest OS 150 or the VM to determine when the core file 145 is complete. For example, the crash agent 122 may wait until the guest OS 150 has finished writing data to the core file 145 before copying the core file 145 and other data to a data storage location (e.g., local storage unit 118) for analysis. To determine whether the core file 145 is complete, the crash agent 145 may monitor I/O requests made by the guest OS 150 and consider the core file 145 complete when the guest OS 150 stops making I/O requests to the core file 145. For example, the crash agent 122 may consider the core file 145 complete in response to determining that the guest OS 150 has not made a request to write data to the core file 145 within a threshold amount of time since the most recent write to the core file 145.

The techniques of determining whether a VM's guest OS has crashed based on the core file 145 and/or the log file 143 and copying relevant data in response to determining that the crash has occurred are particularly beneficial in high availability (HA) applications. In an HA application, VMs may be grouped into HA clusters. The VMs in an HA cluster can provide redundancy for one another. For example, if a VM of an HA cluster crashes, another VM can be activated to take the place of the crashed VM.

A VM may overwrite a core file (or other data) it created for a previous crash of the VM. If the data for the previous crash has not been copied to another storage location, the data may be lost, precluding analysis of the crash data. The techniques described herein can prevent such loss of data by more accurately determining when a VM's guest OS has crashed and copying the appropriate data to another location so that the data can be analyzed.

Figure 2:
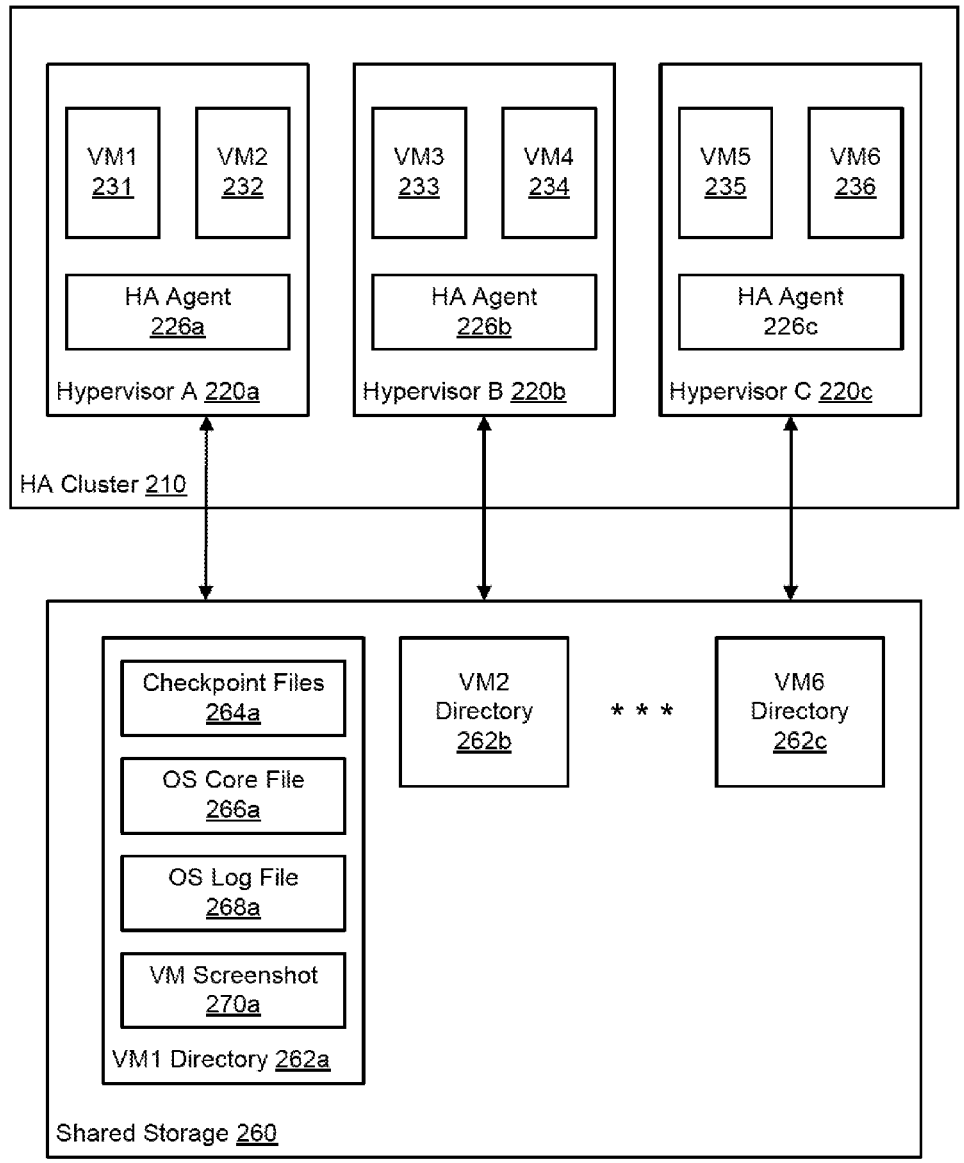
FIG. 2 shows an architecture for an example system configured to manage virtual machine crashes in a high availability cluster.

FIG. 2 shows an architecture for an example system 200 configured to manage virtual machine crashes in an HA cluster 210. The HA cluster 210 can include one or more physical machines that each hosts one or more hypervisors 210. In this example, the HA cluster 210 includes three hypervisors 220a-220c that each manage the execution of two VMs. Of course, the HA cluster 210 can include a different number of hypervisors and each hypervisor can manage a different number of VMs, e.g., the hypervisor 220a may manage one number of VMs while the hypervisor 220b may manage a different number of VMs.

Each hypervisor 220a-220c includes a respective HA agent 226a-226c. Each HA agent 226a-226c can manage the execution of VMs within its cluster. In particular, the HA agent 226a manages the execution of VMs 231 and 232; the HA agent 226b manages the execution of VMs 233 and 234; and the HA agent 226c manages the execution of VMs 235 and 236. The HA agents 226a-226c may also manage failover between redundant VMs in their clusters. For example, if the VM 231 fails, the HA agent 226a may initialize the VM 232 to perform the operations of the VM 231.

Each HA agent 226a-226c can also perform the functions of (or include) a crash agent, e.g., the crash agent 122 of FIG. 1. Each HA agent 226a-226c can monitor its respective VMs to determine whether the VMs (or their guest OSs) are unresponsive and/or crashed. Each VM may have a status driver that sends a status indicator to its respective HA agent 226a-226c. For example, VMs 231 and 232 may each include a status driver that sends a status indicator to the crash agent 226a. The HA agents 226a-226c can use the status indicator for a VM to determine whether the VM has crashed or become unresponsive. The HA agents 226a-226c can also access log files, core files, I/O activity, a screenshot, and/or other data for a VM, as described above with reference to FIG. 1, to determine whether a VM's guest OS has crashed.

In some implementations, the technique by which the HA agent determines whether a VM's guest OS has crashed can be selected for each VM in the HA cluster 210, for each hypervisor 220a-200c, or for each VM independently. This selection may be made by a user. For example, the user may select, for the VM 231, a technique that determines whether the guest OS of VM 231 has crashed based on a status indicator. The user may also select a different technique for the VM 232 that evaluates one or more files (e.g., a core file and/or a log file) of the VM 232 to determine whether the guest OS of the VM 232 has crashed. In this example, the HA agent 226a may determine whether the guest OS of VM 231 has crashed based only on a status indicator provided by the VM 231. If the HA agent 226a has not received the status indicator from the VM 231 within a threshold amount of time from the previous status indicator provided by the VM 231, the HA agent 226a may determine that the guest OS of the VM 231 has crashed. To determine whether the guest OS of the VM 232 has crashed, the HA agent 226a may monitor a status indicator provided by the VM 232 to determine whether the VM 232 has become unresponsive. For example, the HA agent 226a may determine that the VM 232 has become unresponsive if the HA agent 226a has not received the status indicator from the VM 232 within a threshold amount of time from the previous status indicator provided by the VM 232. In response, the HA agent 226a may access a core file and/or log file of the VM 232 to determine whether the guest OS of the VM 232 has crashed, as described above. The user may also select to disable crash detection for one or more VMs.

The hypervisors 220a-220c and/or the HA agents 226a-226c can store data for the VMs 231-236 in local storage units of the physical machines on which the hypervisors are executing or in a shared storage 260. The shared storage 260 can include virtual storage (e.g., a virtual disk) and/or hardware storage (e.g., hardware disk or flash memory) for storing the data. The shared storage 260 can include data used by the VMs 231-236 during their normal operation and/or data related to VMs that have crashed. For example, the hypervisors 220a-220c may store data related to applications executed by the VMs 231-236 in the shared storage 260. The HA agents 226a-226c may store data related to VMs that have crashed in the shared storage 260.

The shared storage 260 can include a memory directory 262a-262c for each VM 231-236, or for each VM that has crashed. The directory 262a-262c for a particular VM can include data collected in response to the VM's guest OS crashing. For example, the directory 262a includes checkpoint files 264a, a core file 266a, a log file 268a, and a screenshot 270a for the VM 231. Of course, other data and files can also be stored in the directory for a VM. By having an independent directory for each VM, the data related to a particular VM may not be overwritten by data for a different VM that has crashed. Although memory directories 262a-262c are illustrated in FIG. 2, data related to the VMs can be stored using other data storage mechanisms (e.g., databases or key-value stores) or in other storage locations as long as the data is related in some way to the VMs (e.g., the data is stored with a reference to the data's corresponding VM).

When an HA agent 226a-226c determines that a VM's guest OS has crashed, the HA agent 226a-226c can collect the appropriate data from the VM's virtual memory and store the data in a directory for the VM in the shared storage 260. This data can then be analyzed to determine what caused the VM's guest OS to crash and/or to restart the VM. The data can be analyzed by a person, e.g., a system designer, or by a computer. For example, a computer may compare a screenshot of the VM to screenshots of known types of crashes to determine whether the VM crashed due to one of the known types of crashes.

In some implementations, the data related to crashed VMs that are stored in the shared storage 260 is inaccessible to the VMs during their normal operation. This prevents the VMs from overwriting data in the shared storage 260 when the VMs crash. In addition, a directory 262a-262c for a particular VM can include data related to multiple crashes of the particular VM. For example, if a VM has crashed two different times, data related to the second crash may not overwrite data related to the first crash. In some implementations, the directory 262a-262c for a VM includes an index based on the time and date of the crash(es). The index can be used to differentiate the data for each of multiple crashes for a particular VM. For example, the core files (and/or other data files) for each crash may have data appended to their file names. This data may identify the particular crash and/or the time and date of the particular crash. The appended data of the data files can be used to identify data files related to a particular crash of the VM.

Figure 3A:
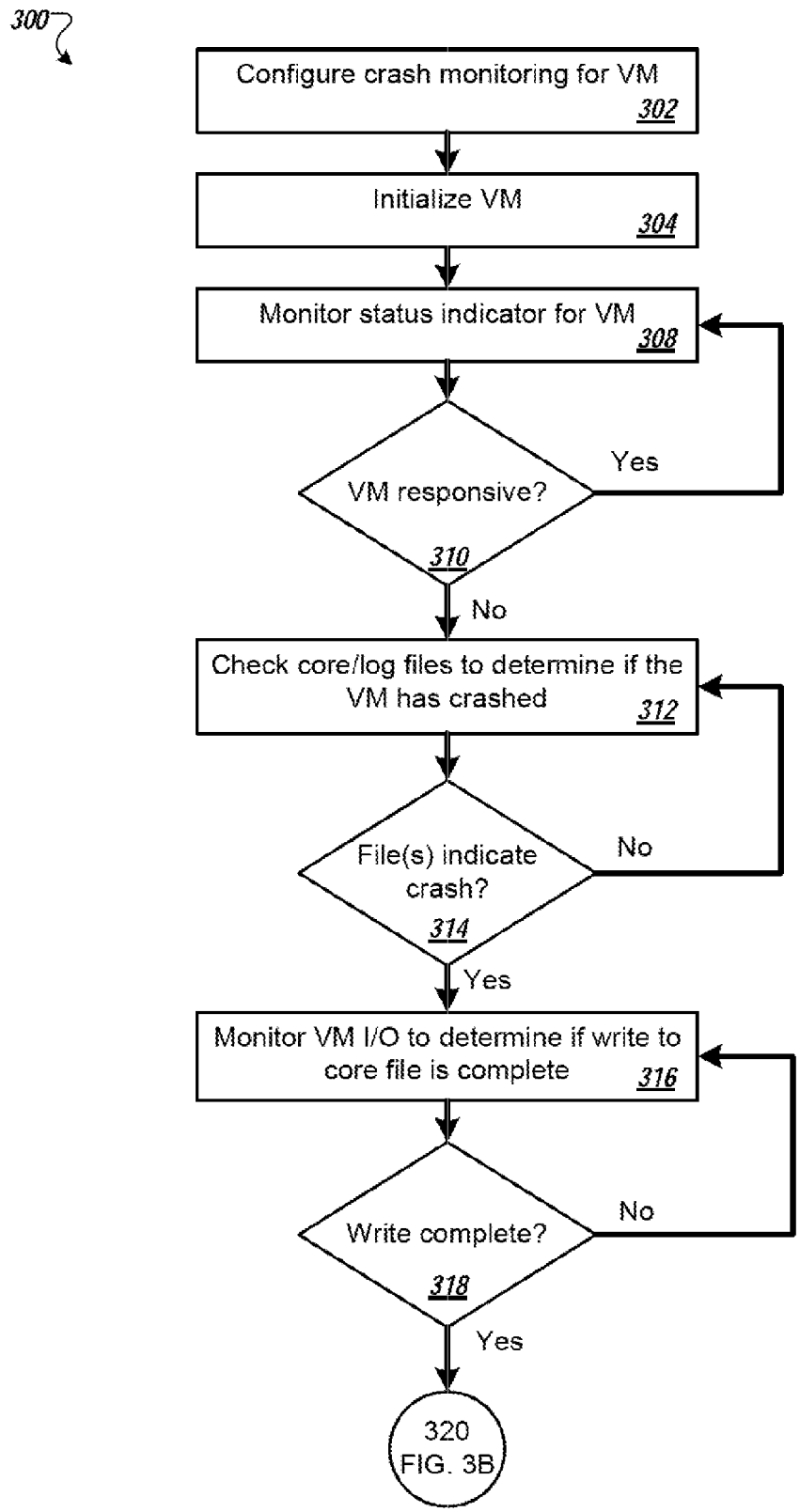
FIGS. 3A and 3B show a flow chart of an example technique for managing virtual machine crashes.
Figure 3B:
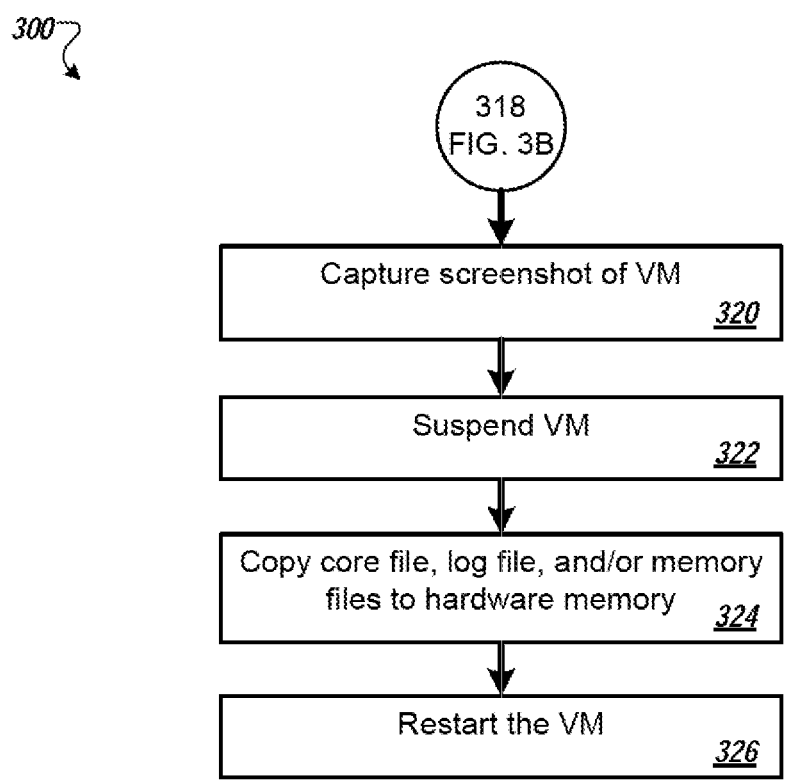

FIGS. 3A and 3B show a flow chart of an example technique 300 for managing VM crashes. The example technique 300 is performed by a system of one or more computers. For example, the technique 300 may be performed by a physical machine configured to execute one or more virtual machines, e.g., the physical machine 102 of FIG. 1.

The system configures crash monitoring for a VM (302). In some implementations, a hypervisor, e.g., the hypervisor 120 of FIG. 1, provides a user interface for an administrator or other user to select a crash monitoring technique for the VM. For example, the user may select from several different crash monitoring techniques. The techniques available for selection may include a technique in which a crash agent (or an HA agent) monitors a status indicator provided by a status driver of the VM. In this technique, as described above, if the crash agent does not receive a status indicator from the VM within a threshold amount of time from the time in which the crash agent received the previous status indicator from the VM, the crash agent may determine that the VM (or its guest OS) has crashed. Another crash monitoring technique available for selection involves evaluating one or more files (e.g., log files and/or core files) to determine whether the VM has crashed, as described above. Other crash monitoring techniques can also be provided for selection. In this example technique 300, the system has configured crash monitoring to use the technique that includes evaluating the one or more files to determine whether the VM has crashed.

The system initializes the VM (304). For example, the hypervisor 120 may initialize the VM and manage the execution of the VM after the VM is initialized. This initialization may also activate crash monitoring for the VM.

The system monitors a status indicator for the VM (306). The VM may include a status driver, e.g., the status driver 147 of FIG. 1, that provides a status indicator to a crash agent or HA agent, e.g., the crash agent 122 of FIG. 1, of the hypervisor periodically. The crash agent can monitor for receipt of the status indicator from the VM and monitor the amount of time that has lapsed since the last status indicator was received.

The system determines whether the VM is responsive (310). The crash agent can determine whether the VM is responsive based on the status indicator received from the VM. For example, the crash agent may determine whether a threshold amount of time has passed since the status driver provided a status indicator. If at least the threshold amount of time has passed, the crash agent may determine that the VM is not responsive. If less than the threshold amount of time has passed since the crash agent received a status indicator from the status driver, the crash agent 122 may determine that the VM is responsive. The crash agent may check for the status indicator periodically, e.g., every few seconds.

If the system determines that the VM is responsive, the system continues to monitor the status indicator for the VM (308). If the system determines that the VM is not responsive, the system evaluates one or more files to determine whether the VM's guest OS has crashed (312). In some implementations, the crash agent identifies the location of a core file generated by the guest OS and evaluates the core file (e.g., the contents of the core file) to determine whether the guest OS has crashed. For example, the guest OS may write data related to the VM's state before the crash to the core file. The crash agent can evaluate the contents of the core file to determine whether the guest OS has crashed. For example, the inclusion of any data, or any data that has been recently written (e.g., within a threshold amount of time before the VM was determined to be unresponsive) to the core file may indicate that the VM's guest OS has crashed. If the crash agent cannot identify a core file for the VM, or the core file is empty or only includes old data (e.g., data that was written to the core file at least a threshold amount of time before the VM was determined to be unresponsive), the crash agent may determine that the guest OS has not crashed.

The crash agent may also evaluate the contents of a log file for the VM to determine whether the VM's guest OS has crashed. For example, the crash agent may determine that the guest OS has crashed in response to identifying that the log file includes data indicating that the guest OS wrote data to a core file. As described above, the crash agent may also use the log file for the VM to determine the location in virtual storage of the core file for the VM.

If the system determines that the VM's guest OS has not crashed (314), the system can continue to monitor the VM.

For example, the crash agent can monitor the core file and/or log file for the VM and/or monitor for a return of the status indicator.

In some implementations, the crash agent may monitor the core file (or for the presence of the core file) for a particular amount of time. If the crash agent does not detect that the guest OS has crashed based on the core file within the particular amount of time, the crash agent may evaluate the VM's status driver to determine why the VM has been unresponsive. For example, the crash agent may evaluate a log file of the VM's status driver to determine whether the status driver has crashed. The crash agent may determine that the status driver has crashed, for example, in response to the status driver's log file not including a log of recent activity (e.g., activity of the status driver within a threshold amount of time before the log file is evaluated. If the crash agent determines that the status driver has failed, the crash agent may restart the status driver.

If the system determines that the VM has crashed based on the contents of the one or more files, the system monitors the VM's O activity to determine if the guest OS has completed its write to the core file (316). In some implementations, the crash agent monitors input and output requests initiated by the guest OS to identity requests made with respect to the core file. If the crash agent detects requests made with respect to the core file, the crash agent may determine that the guest OS has not yet completed its write to the core file. The crash agent may determine whether the guest OS has completed its write to the core file based on an amount of time that has passed since a previous request was made with respect to the core file. If at least a threshold amount of time has passed after a request was made with respect to the core file without identifying any subsequent requests, the crash agent may determine that the guest OS has completed its write to the core file.

If the system determines that the core file is not complete (318), the system may continue to monitor the VM's I/O requests to determine when the core file is complete (316). If the system determines that the core file is complete, the system can optionally capture a screenshot of the VM (320). The screenshot can provide data related to the cause of the guest OS crash, much like a "Blue Screen of Death" or other error message screen. The screenshot may be a screenshot of a virtual display of the VM's virtual hardware platform. For example, the crash agent 122 may obtain data output by the guest OS for display by the virtual display. This data may be obtained from I/O requests made by the guest OS. For example, the guest OS may submit an output request having data for display by the virtual display and the crash agent may obtain and store this data.

The system suspends the VM (322). The hypervisor may suspend the VM in response to determining that the VM's guest OS has crashed so that certain data can be obtained regarding the crash.

The system copies files and other data to hardware storage or another memory location for analysis (324). The crash agent may store the core file, log file, memory files, screenshot and/or other data to a data storage location that is not written to by the VM or another VM. The system may compare the screenshot for the VM to screenshots related to known types of guest OS crashes to determine the cause of the guest OS crash. If the screenshot for the VM matches, or is sufficiently similar to a particular screenshot, the system may determine that the cause of the guest OS crash is the same type as the type of crash for the particular screenshot. The system can provide data specifying the type of crash to a user, for example, by displaying the data or automatically sending a message (e.g., an e-mail) to the user.

The system can optionally restart the VM (326). The hypervisor may restart the VM after copying all of the appropriate data. The hypervisor may also use some of the data, such as memory checkpoint data, before restarting the VM.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in sonic cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   determining that a virtual machine is unresponsive;
   in response to determining that the virtual machine is unresponsive:
   identifying one or more files in which a guest operating system (OS) of the virtual machine writes data when the guest OS abnormally terminates, the one or more files being stored in virtual storage;
   determining, based on contents of the one or more files, whether the guest OS has abnormally terminated; and
   in response to determining that the guest OS has abnormally terminated, monitoring requests initiated by the virtual machine to determine whether the guest OS has finished writing to the one or more files; and in response to determining that the guest OS has finished writing to the one or more files:
copying the one or more files to a location in hardware storage; and
restarting the virtual machine.

2. The method of claim 1, wherein:
the virtual machine is a member of a high availability cluster; and
copying the one or more files to hardware memory comprises copying the one or more files to a shared storage for the high availability cluster.

3. The method of claim 1, wherein monitoring requests initiated by the virtual machine comprises monitoring input and output requests directed to the one or more files.

4. The method of claim 1, further comprising:
capturing display data output by the virtual machine in response to determining that the virtual machine has abnormally terminated; and
comparing the display data output by the virtual machine to one or more screenshots to determine a cause for the abnormal termination of the virtual machine, wherein each of the one or more screenshots is associated with a respective cause.

5. The method of claim 1, further comprising:
suspending the virtual machine in response to determining that the guest OS has finished writing to the one or more files; and
copying content of memory used by the virtual machine to a location in hardware storage that is not written to by the virtual machine prior to restarting the virtual machine.

6. The method of claim 1, wherein the virtual machine is a member of a high availability cluster, the method further comprising:
initiating monitoring of the one or more files to determine whether the guest OS has abnormally terminated in response to determining that a particular crash monitoring setting is active for the virtual machine; and
initiating monitoring of a second virtual machine based on a status indicator in response to determining that the particular crash monitoring setting is inactive for the second virtual machine.

7. The method of claim 1, further comprising accessing a log file for the virtual machine that is stored in virtual storage to identify a memory location for a core file of the virtual machine, wherein determining whether the virtual machine has abnormally terminated comprises evaluating the core file to determine whether the virtual machine has crashed.

8. A system, comprising:
a hardware storage for storing at least one file associated with a guest operating system (OS) of a virtual machine; and
a data processing apparatus configured to interact with the hardware storage, the data processing apparatus being further configured to perform operations comprising:
determining that the virtual machine is unresponsive;
in response to determining that the virtual machine is unresponsive:
identifying one or more files in which the guest OS of the virtual machine writes data when the guest OS abnormally terminates, the one or more files being stored in virtual storage;
determining, based on contents of the one or more files, whether the guest OS has abnormally terminated; and
in response to determining that the guest OS has abnormally terminated, monitoring requests initiated by the virtual machine to determine whether the guest OS has finished writing to the one or more files; and
in response to determining that the guest OS has finished writing to the one or more files:
copying the one or more files to a location in the hardware storage; and
restarting the virtual machine.

9. The system of claim 8, wherein:
the virtual machine is a member of a high availability cluster; and
copying the one or more files to hardware memory comprises copying the one or more files to a shared storage for the high availability cluster.

10. The system of claim 8, wherein monitoring requests initiated by the virtual machine comprises monitoring input and output requests directed to the one or more files.

11. The system of claim 8, wherein:
capturing display data output by the virtual machine in response to determining that the virtual machine has abnormally terminated; and
comparing the display data output by the virtual machine to one or more screenshots to determine a cause for the abnormal termination of the virtual machine, wherein each of the one or more screenshots is associated with a respective cause.

12. The system of claim 8, wherein the data processing apparatus is further configured to perform operations comprising:
suspending the virtual machine in response to determining that the guest OS has finished writing to the one or more files; and
copying content of memory used by the virtual machine to a location in hardware storage that is not written to by the virtual machine prior to restarting the virtual machine.

13. The system claim 8, wherein the virtual machine is a member of a high availability cluster, the method further comprising:
initiating monitoring of the one or more files to determine whether the guest OS has abnormally terminated in response to determining that a particular crash monitoring setting is active for the virtual machine; and
initiating monitoring of a second virtual machine based on a status indicator in response to determining that the particular crash monitoring setting is inactive for the second virtual machine.

14. The system of claim 8, wherein the data processing apparatus is further configured to perform operations comprising accessing a log file for the virtual machine that is stored in virtual storage to identify a memory location for a core file of the virtual machine, wherein determining whether the virtual machine has abnormally terminated comprises evaluating the core file to determine whether the virtual machine has crashed.

15. A non-transitory machine readable storage medium embodying computer software, the computer software causing a computer to perform a method, the method comprising:
determining that a virtual machine is unresponsive;
in response to determining that the virtual machine is unresponsive:
identifying one or more files in which a guest operating system (OS) of the virtual machine writes data when the guest OS abnormally terminates, the one or more files being stored in virtual storage;
determining, based on contents of the one or more files, whether the guest OS has abnormally terminated; and in response to determining that the guest OS has abnormally terminated, monitoring requests initiated by the virtual machine to determine whether the guest OS has finished writing to the one or more files; and in response to determining that the guest OS has finished writing to the one or more files:
copying the one or more files to a location in hardware storage; and
restarting the virtual machine.

16. The machine readable storage medium of claim 15, wherein:
the virtual machine is a member of a high availability cluster; and
copying the one or more files to hardware memory comprises copying the one or more files to a shared storage for the high availability cluster.

17. The machine readable storage medium of claim 15, wherein monitoring requests initiated by the virtual machine comprises monitoring input and output requests directed to the one or more files.

18. The machine readable storage medium of claim 15, wherein the method further comprises:
capturing display data output by the virtual machine in response to determining that the virtual machine has abnormally terminated; and
comparing the display data output by the virtual machine to one or more screenshots to determine a cause for the abnormal termination of the virtual machine, wherein each of the one or more screenshots is associated with a respective cause.

19. The machine readable storage medium of claim 15, wherein the method further comprises:
suspending the virtual machine in response to determining that the guest OS has finished writing to the one or more files; and
copying content of memory used by the virtual machine to a location in hardware storage that is not written to by the virtual machine prior to restarting the virtual machine.

20. The machine readable storage medium of claim 15, wherein the virtual machine is a member of a high availability cluster, the method further comprising:
initiating monitoring of the one or more files to determine whether the guest OS has abnormally terminated in response to determining that a particular crash monitoring setting is active for the virtual machine; and
initiating monitoring of a second virtual machine based on a status indicator in response to determining that the particular crash monitoring setting is inactive for the second virtual machine.

* * * * *